US011172008B2

(12) United States Patent
Wang et al.

(10) Patent No.: US 11,172,008 B2
(45) Date of Patent: Nov. 9, 2021

(54) DATA ANNOTATION AS A SERVICE FOR IOT SYSTEMS

(71) Applicant: CONVIDA WIRELESS, LLC, Wilmington, DE (US)

(72) Inventors: Chonggang Wang, Princeton, NJ (US); Lijun Dong, San Diego, CA (US)

(73) Assignee: Convida Wireless, LLC, Wilmington, DE (US)

( * ) Notice: Subject to any disclaimer, the term of this patent is extended or adjusted under 35 U.S.C. 154(b) by 390 days.

(21) Appl. No.: 14/890,663

(22) PCT Filed: May 16, 2014

(86) PCT No.: PCT/US2014/038420
§ 371 (c)(1),
(2) Date: Nov. 12, 2015

(87) PCT Pub. No.: WO2014/186719
PCT Pub. Date: Nov. 20, 2014

(65) Prior Publication Data
US 2016/0112487 A1    Apr. 21, 2016

Related U.S. Application Data

(60) Provisional application No. 61/824,061, filed on May 16, 2013.

(51) Int. Cl.
*H04L 29/06*    (2006.01)
*G06F 9/54*     (2006.01)
(Continued)

(52) U.S. Cl.
CPC .............. *H04L 65/605* (2013.01); *G06F 9/54* (2013.01); *H04L 67/32* (2013.01); *H04W 4/70* (2018.02)

(58) Field of Classification Search
CPC .................................................... H04L 65/605
See application file for complete search history.

(56) References Cited

U.S. PATENT DOCUMENTS 8,913,552 B2    12/2014  Agrawal et al.
2003/0212243 A1*  11/2003  Hergenrother ..... C08G 73/1039
                                                    528/289
(Continued)

FOREIGN PATENT DOCUMENTS

EP     2 043 008       4/2009
JP     2010-509691 A   3/2010
(Continued)

OTHER PUBLICATIONS

Japanese Application No. 2016-514132: Notice of Reasons for Rejection dated Jan. 25, 2017, 5 pages.
(Continued)

*Primary Examiner* — Moustafa M Meky
*Assistant Examiner* — Sm Z Islam
(74) *Attorney, Agent, or Firm* — BakerHostetler

(57) ABSTRACT

Disclosed herein are a variety of entities, methods, and systems for annotating data in a data stream. Annotation concepts may be applied to individual data items within a stream, data windows within the stream, an entire stream, and/or a portion of a stream that may include several items and windows. Annotation concepts may be based on data received from other entities and may be performed automatically or in response to an annotation request received from an entity.

12 Claims, 14 Drawing Sheets

(51) Int. Cl.
*H04W 4/70* (2018.01)
*H04L 29/08* (2006.01)

(56) References Cited

U.S. PATENT DOCUMENTS

| | | | | |
|---|---|---|---|---|
| 2003/0212543 | A1* | 11/2003 | Epstein | G06F 40/30 |
| | | | | 704/9 |
| 2005/0065903 | A1* | 3/2005 | Zhang | G06Q 30/06 |
| 2006/0101328 | A1* | 5/2006 | Albornoz | G06Q 10/10 |
| | | | | 715/201 |
| 2007/0280381 | A1* | 12/2007 | Amini | H04L 67/2804 |
| | | | | 375/340 |
| 2008/0270130 | A1* | 10/2008 | Alonso | G10L 15/063 |
| | | | | 704/236 |
| 2009/0154893 | A1* | 6/2009 | Vasudevan | H04N 5/765 |
| | | | | 386/207 |
| 2011/0295853 | A1* | 12/2011 | Li | G06F 16/122 |
| | | | | 707/736 |
| 2012/0188940 | A1 | 7/2012 | Agrawal et al. | |
| 2013/0031454 | A1* | 1/2013 | Griffiths | G06F 17/2247 |
| | | | | 715/230 |
| 2013/0031457 | A1* | 1/2013 | Griffiths | G06F 17/241 |
| | | | | 715/231 |
| 2013/0110806 | A1* | 5/2013 | Cai | G06F 16/951 |
| | | | | 707/706 |
| 2014/0281889 | A1* | 9/2014 | Treibach-Heck | G06F 16/951 |
| | | | | 715/234 |
| 2015/0039635 | A1* | 2/2015 | Monjas Llorente | H04L 47/805 |
| | | | | 707/754 |

FOREIGN PATENT DOCUMENTS

| | | |
|---|---|---|
| JP | 2010-198111 A | 9/2010 |
| WO | WO 2005-107215 | 11/2005 |
| WO | WO 2008-063973 A2 | 5/2008 |

OTHER PUBLICATIONS

Cornea et al., "Annotation Based Multi Media Streaming Over Wireless Networks", Proceedings of the Embedded Systems For Realtime Multimedia, Oct. 1, 2006, 47-52.

ETSI TS 102690 V1.1.1 "Machine-to-Machine communications (M2M); Functional Architecture", Oct. 2011, 280 pages.

International Application No. PCT/US2014/038420: International Serch Report and The Written Opinion dated Aug. 5, 2014, 10 pages.

Lee et al., "The Internet of Things—Concept and Problem Statement draft-lee-iot-problem-statement-04.txt", Internet Research Task Force, Mar. 12, 2012, 18 pages.

Miller, R., "AT&T Labs Research-Attacking Asthma with Advanced Telehealth Monitoring", Dec. 17, 2012, 3 pages, http://www.research.att.com/articles/featured_stories/2012_12/201212_astj,a_VOC_dete.

Sundmaeker et al, "Vision and Challenges for Realising the Internet of Things", CERP-IoT, Cluster of European Research Projects on the Internet of Things, Mar. 2010, 230 pages.

Korean Application No. 10-2015-7035277: Notice of Preliminary Rejection dated Oct. 11, 2016.

* cited by examiner

DATA ANNOTATION AS A SERVICE FOR IOT SYSTEMS

CROSS-REFERENCE TO RELATED APPLICATIONS

This application is a National Stage Application filed under 35 U.S.C. 371 of International Application No. PCT/US2014/038420, filed May 16, 2014, which claims the benefit of U.S. Provisional Patent Application No. 61/824,061, filed on May 16, 2013, entitled "DATA ANNOTATION AS A SERVICE FOR IOT SYSTEMS", the contents of which are hereby incorporated by reference herein.

BACKGROUND

Machine-to-machine (M2M) technologies allow devices to communicate more directly with each other using wired and wireless communications systems. M2M technologies enable further realization of the Internet of Things (IoT), a system of uniquely identifiable objects and virtual representations of such objects that communicate with each other and over a network, such as the Internet. IoT may facilitate communications with even mundane everyday objects, such as products in a grocery store or appliances in a home, and thereby reduce costs and waste by improving knowledge of such objects. For example, stores may maintain very precise inventory data by being able to communicate with, or obtain data from, objects that may be in inventory or may have been sold.

IoT entities and systems are highly diverse and may have a wide variety of characteristics, applications, and functions. As will be appreciated, this diversity of entities generates and receives a wide variety of data. Data collection may take place at a "front-end" entity, such as a sensor and sent to "back-end" entities, such as gateways or networks. Collected data may be stored and processed at similar back-end devices, and provided to users and applications anywhere in an IoT system. As many IoT entities may be relatively simple devices, such devices may generate data streams of raw data with little or no contextual information. Having such information may increase the performance and efficiency of IoT systems.

SUMMARY

Embodiments disclosed herein include methods for receiving, at an annotation entity in a network of connected entities, first data from a first entity in the network of connected entities and receiving, at the annotation entity, a data stream from a second entity in the network of connected entities. The annotation entity may then determine a data annotation to be applied to the data stream and proceed to annotate the data stream based on the data annotation.

Embodiments disclosed herein further include an annotation entity in a network of connected entities that, when executing instructions on a processor, receives first data from a first entity in the network of connected entities and a data stream from a second entity in the network of connected entities. The annotation entity may then determine a data annotation to be applied to the data stream and annotate the data stream based on the data annotation.

Embodiments disclosed herein further include an annotation entity in a network of connected entities that, when executing instructions on a processor, receives a request for a first annotation concept from an annotating entity and, in response, transmits a request for a second annotation concept to an annotation concept entity. Upon receiving the second annotation concept from the annotation concept entity, the annotation entity may generate the requested first annotation concept based on the second annotation data and transmit the first annotation concept to the annotating entity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION OF ILLUSTRATIVE EMBODIMENTS

Figure 1:
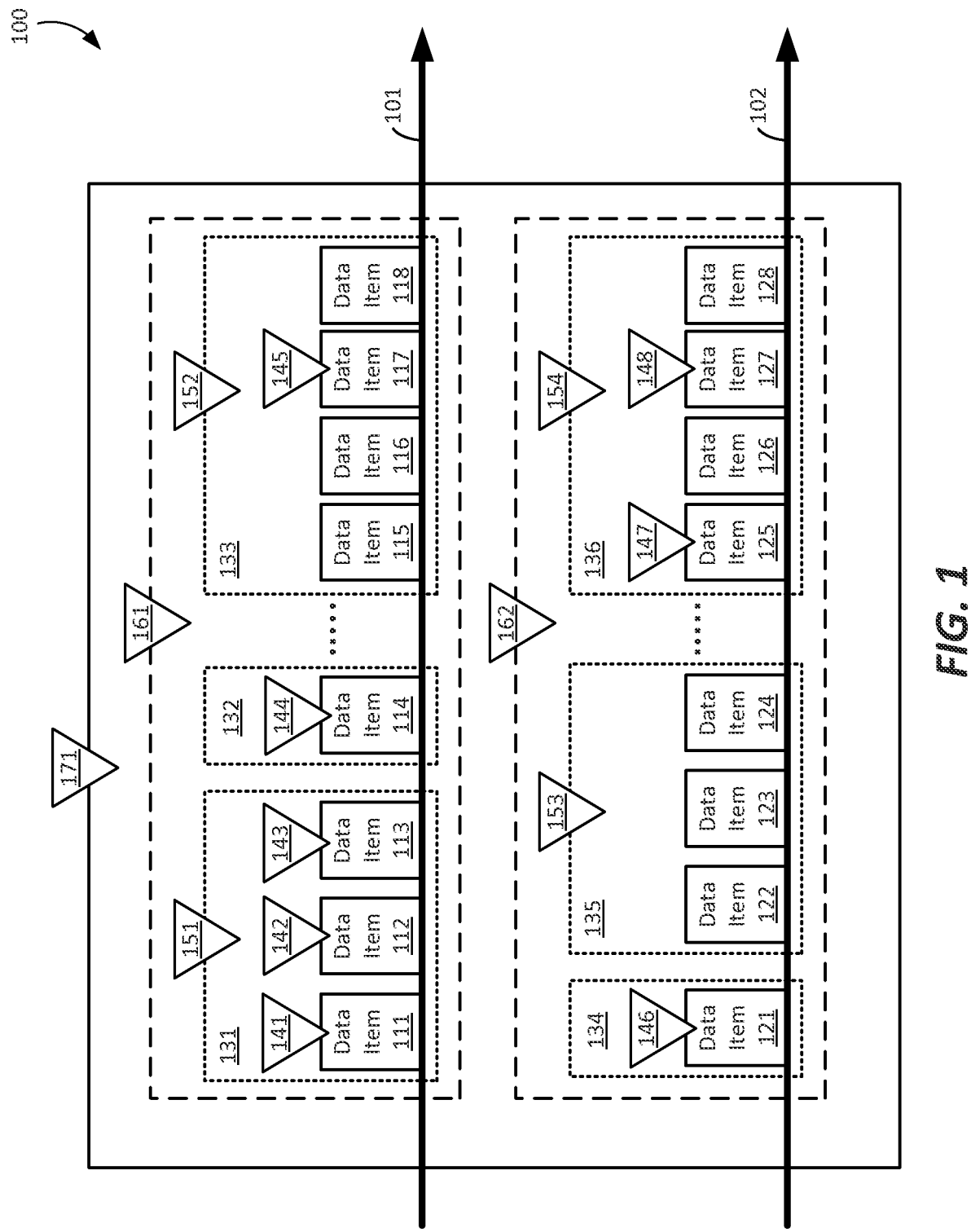
FIG. 1 illustrates exemplary data streams, windows, and items to which data annotation as a service may be applied according to an embodiment.

The embodiments set forth herein may be described in terms of a representational state transfer (REST) architecture, with components and entities described conforming to the constraints of a REST architecture (RESTful architecture). A RESTful architecture is described in terms of the constraints applied to components, entities, connecters, and data elements used in the architecture rather than in terms of physical component implementation or communications protocols used. Thus, the roles and functions of the components, entities, connecters, and data elements will be described. In a RESTful architecture, representations of uniquely addressable resources may be transferred between entities. One skilled in the art will recognize that implementations of the instant embodiments may vary while remaining within the scope of the present disclosure. One skilled in the art will also recognize that the disclosed exemplary embodiments, while sometimes described herein in reference to the European Telecommunications Standards Institute (ETSI) M2M architecture, are not limited to implementations using the ETSI M2M architecture. The disclosed embodiments may be implemented in other architectures and systems that have connected entities, such as oneM2M and other M2M systems and architectures.

IoT systems may include many different kinds of sensors, each of which may produce different types of raw sensory data. This data may have very diverse characteristics depending on the type of sensor and sensor requirements. In one embodiment, "small data" that is several or tens of bytes may be generated by a sensor. For example, a temperature reading from a temperature sensor may be small data. To transmit each piece of small data separately may introduce excessive overhead in an IoT system and/or entities therein, especially when a large number of sensors may be involved and/or each sensor is continuously generating data. Data generated by a sensor continuously (i.e., the sensor generates a data stream) may have high tempo correlation. That is, the data may be unchanged for long periods of time, such as temperature data for a room. Such tempo-correlated data may be aggregated without losing key information. Note that a single reading may be considered a special data stream. Data generated by several sensors of the same type scattered about a physical region may have spatial correlation, where the multiple sensors generate very similar or highly correlated data. Thus, this type of data may also be aggregated without a loss of key information. Sensory data from different types of sensors may have application-level correlation, where their functions or services are related in some way. For example, data from a smoke sensor and a temperature sensor may be correlated with each other if both are triggered by a fire. In another example, data from a body sensor on an asthmatic patient may be correlated to sensory data from a smoke sensor or a fragrance sensor. Such application-level correlated sensory data may be leveraged based on common or similar characteristics to improve event prediction and observation accuracy.

Data may be captured, or observed, in various manners in an IoT system. In an embodiment, data may be observed, transmitted, or otherwise collected in response to detected events (may be referred to as "event-based data observation"). An event may be detected, or an automatic notification may be generated on an occurrence of an event, and in response data may be transmitted or collected. Any type of event is contemplated, such as meeting or passing a threshold (e.g., low-level temperature event passing a temperature threshold), occurrence of a detectable event, (e.g., high-level emergency event such as detection of a fire), or any other event that may be detected or generated by an IoT entity. In another embodiment, data may be collected by an IoT entity as needed (may be referred to as "query-based data observation"), where the IoT entity sends a request for the desired data to an entity that has access to the desired data. In still other embodiments, data may be collected continuously (may be referred to as "continuous data observation"), where data may be continuously generated and/or collected (i.e., generation and/or collection of a data stream). Any of these data observation methods may be used in combination with any other to implement "hybrid data observation", where an IoT entity may jointly exploit event-based, query-based, and/or continuous data observation. Note that the entities described herein that perform data collection and/or data annotation may simply be referred to as "annotation entities". These entities but may be any one or more entities in any network of communicatively connected entities, and each such entity may be implemented in one or more devices, systems, networks, etc. All such embodiments are contemplated as within the scope of the present disclosure.

As noted, there may be many diverse raw data streams generated in an IoT system. Each data stream may include a number of data items. For example, a data stream may be a series of continuous readings from a smart electricity meter. Multiple data items of a data stream may be treated as a data window, and thus a data stream may have multiple data windows.

Raw data steams may not provide much useful information or value until they are collected and analyzed. To efficiently analyze raw data streams, or to further analyze data streams that have already been processed, additional information may be added into a data stream that may be used for IoT data mining and analytics. Such information may, for instance, facilitate determining correlations between data streams, interactions among IoT things, interactions among people and IoT things, etc. Adding additional information to an existing data stream may be referred to as "data annotation." An annotation added to a data stream may be information that provides additional semantics or contextual information to describe the data steam in some way. Such information may be referred to as "data annotation concepts" or "data annotation data." In an embodiment, a data stream may be modified to indicate the surrounding situation, or context, in which the data stream was generated, the relevant people, activity, or IoT thing status at the time of generation of the data stream, an event that triggered the generation of the data stream is generated, a condition under which the data stream was generated, a location, time, type, and/or source of a data stream, and/or a correlation among different data streams. An important factor in reducing the performance impact of data annotation may be determining an appropriate time to annotate the data stream (e.g., during data collection or after data collection) and a granularity of the data annotation (e.g., annotation added to a data item, a data window, a data stream, multiple streams, etc., described in more detail herein).

Data annotation can be leveraged for many IoT applications to annotate various IoT data streams, such as energy data in smart home energy systems where smart meters are deployed to measure real-time energy consumption or temperature data from temperature sensors. Raw data (e.g., instantaneous smart meter readings or temperature readings) may not be enough to fully determine needed characteristics of a system. For example, appliance status, activities being performed in the home, time of day, or number of people in a home may provide additional data that may be used to determine, for example, power consumption or appropriate temperature settings. Thus, additional data that indicates, for example, number of people in a home, etc., may be added to data streams as annotations for improved data stream processing. For example, a home gateway that connects to a smart meter may add notations to a data stream generated by sensors in the home reflecting additional data. While collecting energy data from a sensor, a gateway may simultaneously analyze other data from other sources, such as other sensors, to determine the annotation concept, which may include such data as appliance status, number of people in a home, etc.

Annotations may be added to a single data item, a data window containing one or more data items, an entire data stream, and to multiple data streams. Exemplary, non-limiting representation 100 of multi-level IoT data annotation is illustrated in FIG. 1, which shows data streams 101 and 102, containing data items 111-118 and 121-128, respectively. Item-level annotations 141-145 may be annotated to some of the individual data items in stream 101 while data items 146-148 may be annotated to some of the data items in stream 102, as shown in FIG. 1.

Window-level annotations 151 and 152 may be annotated to data windows 131 and 133, respectively, while data window 132 of stream 101 may not be annotated, while data item 144 in data window 132 may be annotated. Similarly, window-level annotations 153 and 154 may be annotated to data windows 135 and 136, respectively, while data window 134 of stream 101 may not be annotated, while data item 124 in data window 134 is annotated. The use of window-level annotations may allow the sharing of an annotation by multiple data items within a same data window, in some embodiments reducing overhead compared to item-level annotation.

Entire streams may also be annotated. As seen in FIG. 1, data stream annotation 161 may be applied to data stream 101 while data stream annotation 162 may be applied to data stream 102. The use of data stream-level annotation may allow the sharing of an annotation by all data items within a same data stream, in some embodiments even further reducing overhead compared to window-level annotation.

In an embodiment, annotations may be applied to multiple streams. As seen in FIG. 1, cross-stream annotation 171 may be applied to both data stream 101 and data stream 102. The use cross-stream annotation may allow the sharing of an annotation by data items within multiple data streams, in some embodiments even further reducing overhead compared to data stream-level annotation. In one such embodiment, as shown in FIG. 1, cross-full-stream annotation may be applied to all data items within multiple data stream, for example, as annotation 171 is applied to all data items of data streams 101 and 102.

Figure 2:
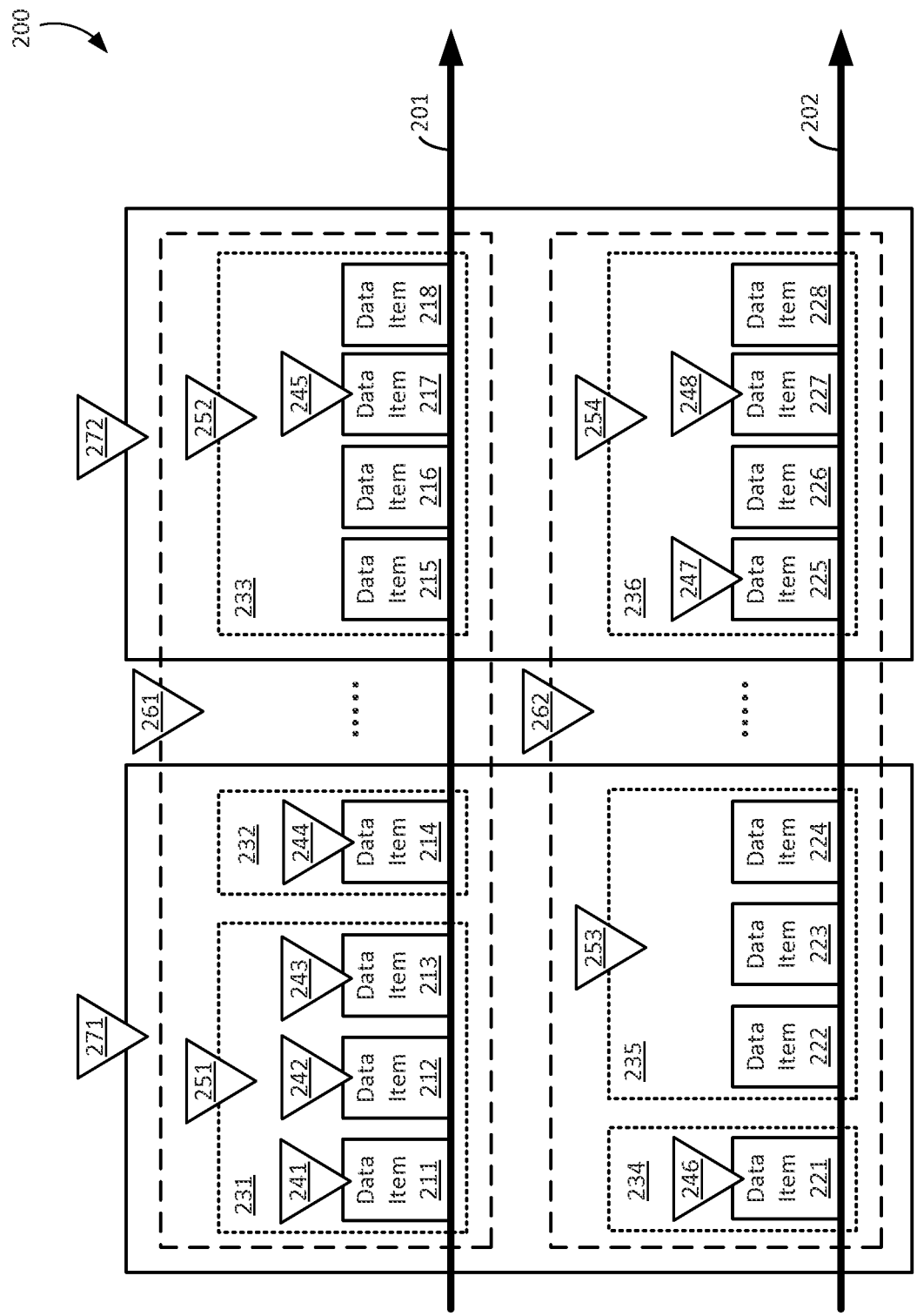
FIG. 2 illustrates additional exemplary data streams, windows, and items to which data annotation as a service may be applied according to an embodiment.

Alternatively, referring now to FIG. 2 illustrating exemplary, non-limiting representation 200 of multi-level IoT data annotation, cross-partial-stream annotation may be employed, where annotation is applied across data streams, but not across each entire data stream of the multiple data streams. As shown in FIG. 2, similar to FIG. 1, item-level annotations 241-245 may be annotated to some of the individual data items in stream 201 while data items 246-248 may be annotated to some of the data items in stream 202, window-level annotations 251, 252, 253, and 254 may be annotated to data windows 231, 233, 235, and 254, respectively, while data windows 232 and 234 may not be annotated, and data stream annotation 261 may be applied to data stream 201 while data stream annotation 262 may be applied to data stream 202. In this embodiment, cross-partial-stream annotation 271 may be applied to a subset of the data items of both of data streams 201 and 202, while cross-partial-stream annotation 272 may be applied to another subset of the data items of both of data streams 201 and 202 as shown in FIG. 2.

As noted, the disclosed multi-level data annotation provides multiple data annotation approaches to assist in the reduction of total overhead and increasing the efficiency of data annotation. Note that in the disclosed embodiments, multiple different annotations may be applied to a single data item, data window, data stream, or the same set or subset of multiple data streams.

Figure 3:
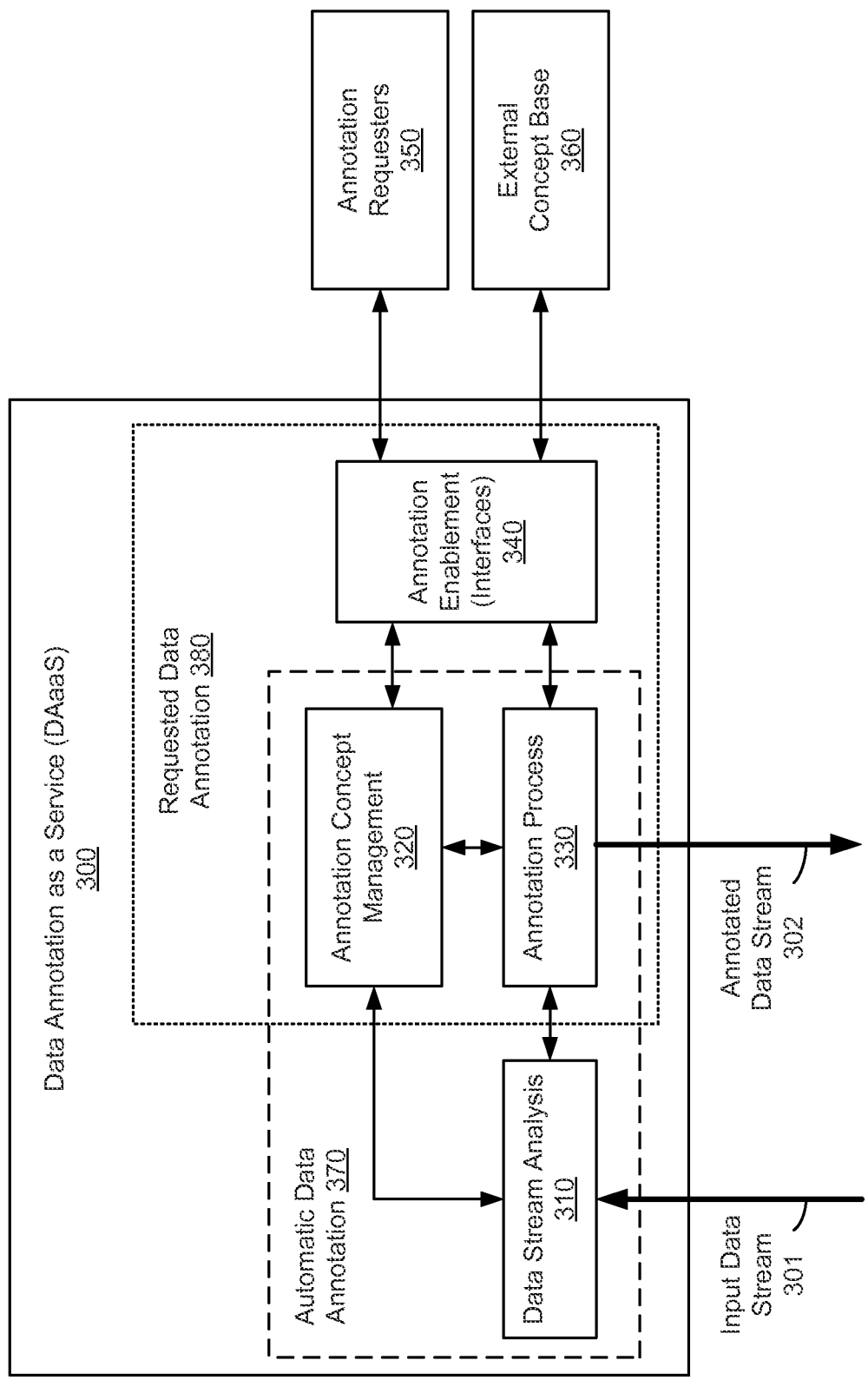
FIG. 3 illustrates an exemplary configuration in which data annotation as a service may be implemented according to an embodiment.

In an embodiment, data annotation may be provided as an IoT service capability that may be referred to as "Data Annotation as a Service" (DAaaS). DAaaS may be integrated into an existing IoT service capability or service layer platform (e.g., ETSI M2M, oneM2M) or implemented as a standalone service capability to be leveraged by other service capabilities or common service entities. DAaaS may reside at an IoT device, an IoT gateway, and/or an IoT server. FIG. 3 illustrates the interaction of various functions and entities that may implement DAaaS. An IoT entity may perform data stream analysis 310 where data stream 301 (e.g., from a smart meter or a temperature sensor) is analyzed to determine context information associated with stream 301. For example, context information associated with stream 301 may include data about the environment about the sensor generating stream 301, such as the status of proximate things (e.g., appliances, people, activities, etc.), that may be used to automatically determine annotation concepts that may be applied to other data streams (e.g., utility consumption from smart meters, temperature data from temperature sensors). Data stream analysis function 310, which may be implemented in one or more IoT entities, may determine the context data for input data stream 301 and the determined context data may be stored at annotation concept management 320, which may be a database or other entity that may store data that may be used to annotate data streams.

In an embodiment, automatic data annotation (ADA) 370 may be a function implemented by one or more IoT entities that, upon detection of a condition, automatically trigger a data annotation process that annotates data streams. ADA 370 may involve interactions between data stream analysis function 310, the internal concept base of annotation concept management function 320, and data annotation process 330. ADA enables automated data annotation during data collection. For example, a home gateway may collect data from one or more smart meters in a house. The gateway may also receive or obtain context data from one or more other sensors, such as motion sensors, sound sensors, light sensors, and temperature sensors, that may be deployed to monitor various statuses and activities in the house while collecting smart meter data. The gateway may analyze the context data received from the other sensors to obtain status and/or activity data that it may then use to annotate the smart meter data stream. The annotation concepts or context data may be raw data received from a sensor or data determined by the gateway or another IoT entity based on information received from one or more IoT applications. Annotation concept management 320, having stored the context data received from data stream analysis function 310 or other annotation concepts or data, may provide such data to data annotation process function 330 that may annotate a data stream to generate annotated data stream 302.

Alternatively, or in addition, external annotation requesters 350 may request that an annotation concept be stored at annotation concept management 320 in requested data annotation process (RDA) 380. RDA 380 may be considered annotation on demand. In RDA 380, data may be collected and stored in response to requests from annotation requestors 350 that may be any IoT devices, gateways, servers, applications, other DAaaSs, etc. The data collected or obtained in response to such requests may be provided to data annotation process function 330 by annotation concept management 320. Data annotation process function 330 may in turn annotate a data stream with such data to generate annotated data stream 302. Annotation enablement 340 may provide one or more interfaces for annotation requestors 350 to interact with DAaaS 300. Alternatively, or in addition, requested data annotation process 380 may allow external concept base 360, which may be any one or more IoT entities that may provide annotation concepts, to interact with DAaaS 300 and provide annotation concepts that may be used by annotation process 330 to annotate a data stream, generating annotated data stream 302. Any entity that stores and/or provides annotation concepts or data may also be referred to as an "annotation concept entity" or an "annotation data entity".

Annotation requestors 350 may send one or more annotation requests to DAaaS 300 to trigger requested data annotation process 380. Annotation requestors 350 may specify an external concept or other annotation data that may be stored in external concept base 360, or may provide such data directly from annotation requesters 350 in the annotation request. Annotation requestors 350 may also, or instead, access and manipulate the internal concept base of annotation concept management function 320 via annotation enablement 340 interfaces.

Data annotation process 330 may operate in one or both of automatic data annotation process 370 and requested data annotation process 380. Data annotation process 330 may receive annotation requests and/or triggers from data stream analysis 310 and/or annotation requesters 350 via annotation enablement 340. Data annotation process 330 may determine an appropriate multi-level data annotation scheme. Data annotation process 330 may use both the internal concept base of annotation concept management 320 and external concept base 360 to determine and perform data annotation. Data annotation process 330 may also have an interface to the one or more data streams to be annotated.

Figure 4:
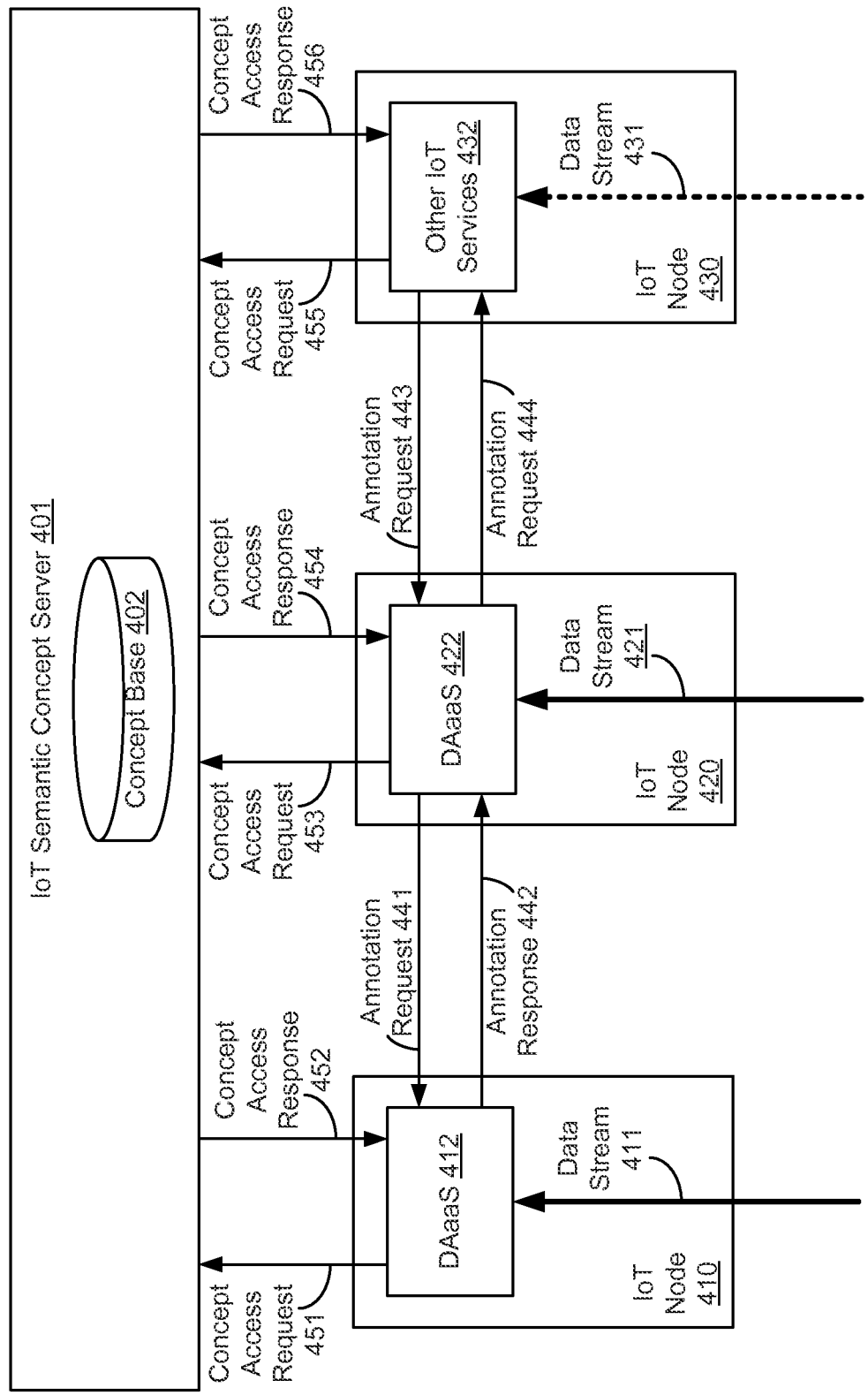
FIG. 4 illustrates an exemplary architecture in which data annotation as a service may be implemented according to an embodiment.

Various embodiments of the present disclosure may employ various DAaaS architectures that may enable DAaaS as a service capability or common service function to interact with other IoT entities (e.g., nodes, services, etc.). FIG. 4 illustrates exemplary, non-limiting DAaaS architecture 400, where a DAaaS resides in an IoT node (e.g., an IoT device, gateway, or server). Such DAaaSs may interact with other IoT Services, other DAaaSs, and one or more IoT semantic concept servers, such as IoT semantic concept server 401. IoT semantic concept server 401 may be any IoT entity and any combination of multiple IoT entities and/or other devices and entities. IoT semantic concept server 401 may maintain annotation concepts and/or annotation data that may be accessed and used by a DAaaS.

In an embodiment, other IoT services 432 in IoT node 430, which may or may not be receiving data stream 431, may send data annotation request 443 to DAaaS 422 in IoT node 420. In response, DAaaS 422 in IoT node 420 may apply annotations to the data stream indicated in request 443 (e.g., data stream 421 or data stream 431 obtained from a source not shown) and may send data annotation response 444 to other IoT services 432. In order to determine the appropriate data annotations to apply, DAaaS 422 may query its internal concept base to determine appropriate annotation concepts and data. DAaaS 422 may also, or instead, access data and concepts from IoT semantic concept server 401 where annotation concepts and data may be stored at concept base 402. DAaaS 422 may send concept access request 453 that may include data related to request 443 and/or IoT node 430, to IoT semantic concept server 401 and subsequently receive concept access response 454 that may include annotation concepts and/or data.

DAaaS 422 may also, or instead, send data annotation request 441 to DAaaS 412 of IoT node 410. For example, DAaaS 422 may determine that the entity that can perform annotation most efficiently may be DAaaS 412. DAaaS 412 may add annotations to data streams received or maintained by IoT node 410 and indicated by annotation request 441. IoT node 410 may then send data annotation response 442 to DAaaS 422. As with DAaaS 422, in order to determine the appropriate data annotations to apply, DAaaS 412 may query its internal concept base to determine appropriate annotation concepts and data. DAaaS 412 may also, or instead, access data and concepts from IoT semantic concept server 401 where annotation concepts and data may be stored at concept base 402. DAaaS 412 may send concept access request 451, that may include data related to request 441 and/or IoT node 420, to IoT semantic concept server 401 and subsequently receive concept access response 452 that may include annotation concepts and/or data.

In another embodiment, other IoT services 432 in IoT node 430 may interact with IoT semantic concept server 401 to determine data annotation concepts and/or data. Other IoT services 432 may send concept access request 455 to IoT semantic concept server 401 requesting annotation data and/or concepts and receive concept access response 456 with the requested data. Other IoT services 432 may then include such data in its requests to DAaaSs, such as annotation request 443 sent to DAaaS 422. This may allow DAaaS 422 to annotate one or more data streams, or components thereof, without requiring DAaaS 422 to query IoT semantic concept server 401.

Note that any of the annotation requests and concept access requests described herein may be requests to retrieve existing annotation concepts and/or data, delete existing annotation concepts and/or data, update existing annotation concepts and/or data, and/or insert new annotation concepts and/or data into an IoT semantic concept server.

Figure 5:
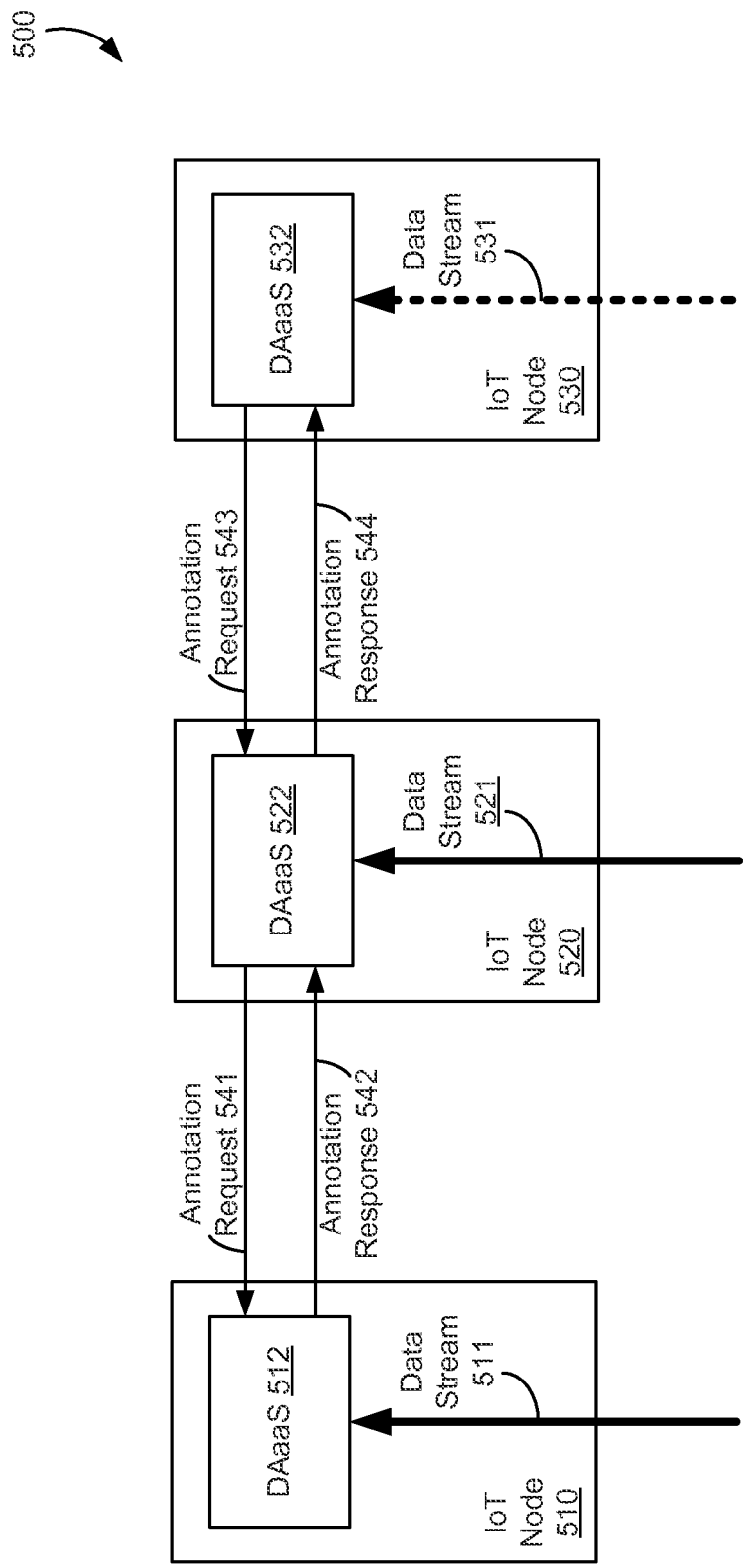
FIG. 5 illustrates another exemplary architecture in which data annotation as a service may be implemented according to an embodiment.

FIG. 5 illustrates the exemplary, non-limiting proxy-based DAaaS architecture 500, where DAaaS 522 serves as a proxy between DAaaS 532 and DAaaS 512. DAaaS 532 at IoT node 530, which may or may not be receiving data stream 531, may desire to request that one or more data streams in IoT node 510 be annotated, but it may not be able to reach DAaaS 512 directly. Therefore, DAaaS 532 may send data annotation request 543 to DAaaS 522 which may relay DAaaS 532's annotation request as annotation request 541 to DAaaS 512. DAaaS 522 may receive annotation response 542 from DAaaS 512 indicating the success or failure of the annotation request. DAaaS 522 may forward the response to DAaaS 532 as annotation response 544.

In some embodiments, DAaaS 532 may communicate in a format or other communications means that is not understood by DAaaS 512. In such embodiments, DAaaS 522 may translate the request, concept, and/or data contained in annotation request 543 into another format or other form that DAaaS 512 can understand. DAaaS 522 may send such translated request, data, etc. to DAaaS 512 within annotation request 541.

While serving as an annotation proxy, DAaaS 522 may combine and/or aggregate annotation requests from DAaaS 532 and/or other DAaaSs into a single annotation request, such as annotation request 541, that may be sent to DAaaS 512. For example, annotation request 543 from DAaaS 532 may request to annotate data items or data windows of data stream indicated in one or more other requests from other DAaaSs. The other DAaaSs may be requesting different annotations of a same data stream than those requested by DAaaS 532. Only data stream may be in common among the requests, although in other embodiments, the annotations may be partially or wholly in common among the requests. In such an embodiment, DAaaS 522 may aggregate some or all of these requests into a single request and send that single annotation request to DAaaS 512 for application to the indicated data stream.

In various embodiments of the instant disclosure, procedures and corresponding messages used in DAaaS may be implemented in various ways. In one embodiment, DAaaS messages and procedures may be implemented as service layer primitives bound to various different lower layer protocols, such as the hypertext transfer protocol (HTTP), the simple object access protocol (SoAP), the constrained application protocol (CoAP), or any other protocol. Alternatively, DAaaS messages and procedures may be implemented using the payloads of application protocols such as HTTP and CoAP and others. In another embodiment, messages and procedures may be implemented as protocol header options of application protocols such as HTTP and CoAP and others. Alternatively, DAaaS messages and procedures may be implemented using device management protocols such as the open mobile alliance (OMA) device management (DM) protocol and others. In yet another alternative, DAaaS messages and procedures may be implemented using short message service (SMS) in a wireless cellular network. All such embodiments are contemplated as within the scope of the present disclosure.

Figure 6:
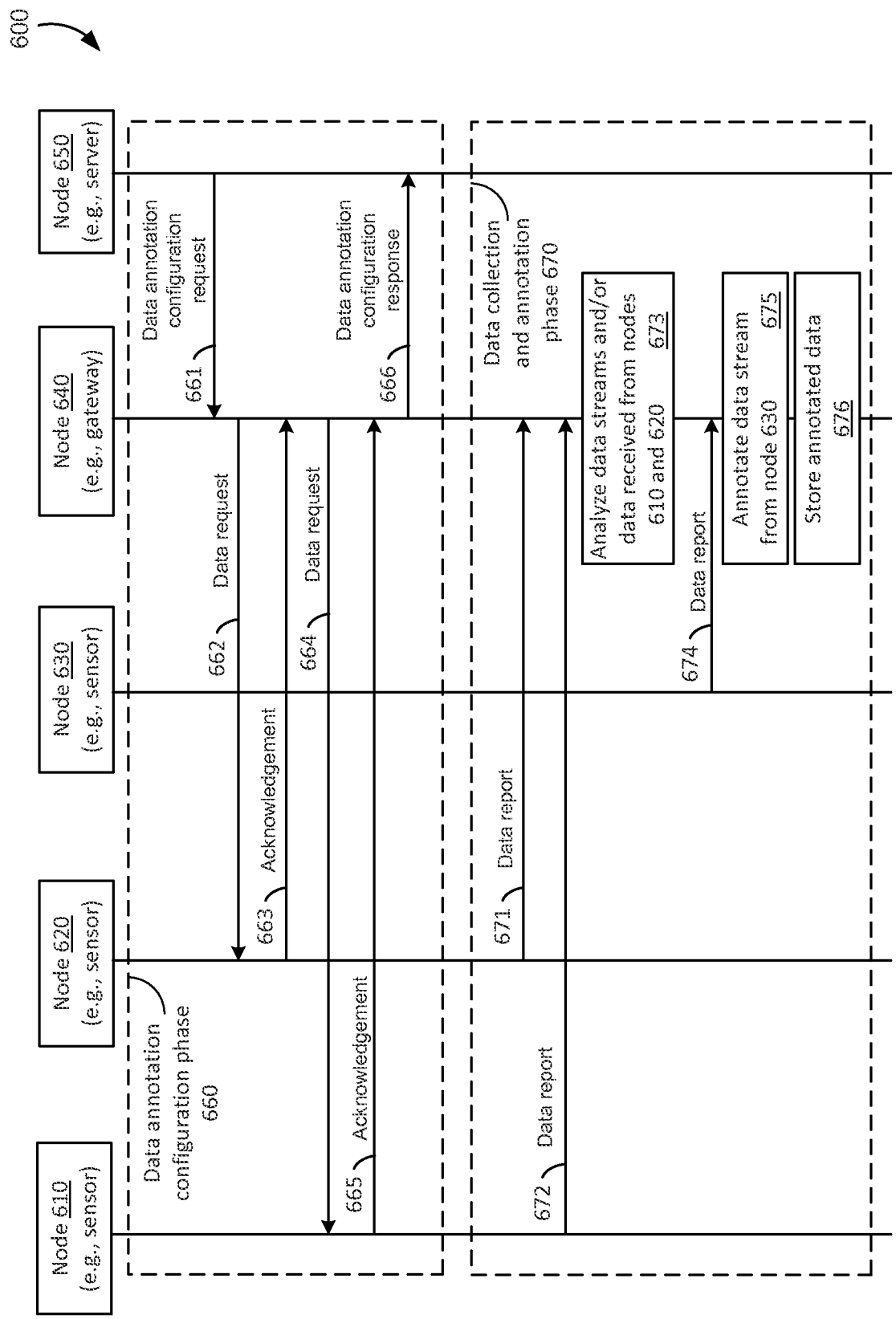
FIG. 6 illustrates an exemplary signal flow that may be used in the disclosed embodiments of data annotation as a service.

FIG. 6 shows exemplary, non-limiting signal flow 600 illustrating exemplary signals and procedures for automatic data annotation (ADA). ADA may include data annotation configuration phase 660 and data collection and annotation phase 670, although phase 670 may be performed without first performing phase 660.

In data annotation configuration phase 660, IoT node 650, which may be, in some embodiments, an IoT server, may send data annotation configuration request 661 to IoT node 640 that may be, in some embodiments, an IoT gateway. Data annotation configuration request 661 may include data indicating the data streams that IoT node 640 should collect and annotate, the data streams that IoT node 640 should collect and analyze to obtain annotation concepts and/or data, and/or the level and data stream on which IoT node 640 should perform data annotation (e.g., item-level annotation, window-level annotation, stream-level annotation, cross-stream annotation, cross-partial-stream annotation, etc.). For example, IoT node 640 may be requested to annotate a data stream transmitted from IoT node 630 based on annotation concepts and/or data to be determined from data streams emanating from IoT node 610 and IoT node 620.

Upon receipt of data annotation configuration request 661, IoT node 640 may determine that it needs to collect a data stream or data related to a data stream from IoT node 620 for analysis and determination of data annotation concepts and/or data in order to annotate the data stream transmitted from IoT node 630 according to the instructions in data annotation configuration request 661. In response, IoT node 640 may send data request 662 to IoT node 620 instructing IoT node 620 to respond with the data specified in data request 662. Data request 662 may enable IoT node 620 to report the requested data to IoT node 640 at data report 671, described in further detail below. IoT node 620, upon receipt of data request 662, may send acknowledgement 663 to IoT node 640 acknowledging receipt of data request 662.

Similarly, upon receipt of data annotation configuration request 661, IoT node 640 may determine that it needs to collect a data stream or data related to a data stream from IoT node 610 for analysis and determination of data annotation concepts and/or data in order to annotate the data stream transmitted from IoT node 630 according to the instructions in data annotation configuration request 661. In response, IoT node 640 may send data request 664 to IoT node 610 instructing IoT node 610 to respond with the data specified in data request 664. Note that the requested data may be different for each of IoT node 610 and 620. Data request 664 may enable IoT node 610 to report the requested data to IoT node 640 at data report 672, described in further detail below. IoT node 610, upon receipt of data request 664, may send acknowledgement 665 to IoT node 640 acknowledging receipt of data request 664.

Upon receiving the acknowledgements from IoT node 610 and IoT node 620, IoT node 640 may send data annotation configuration response 666 to IoT node 510.

In data collection and annotation phase 670, IoT node 620 may send the data requested in data request 662 to IoT node 640 in data report 671. Likewise, IoT node 610 may send the data requested in data request 664 to IoT node 640 in data report 672. At block 673, IoT node 640 may analyze the data streams and/or other data received from IoT node 610 and IoT node 620 to determine annotation concepts and/or data.

IoT node 640 may receive the data stream from IoT node 630 as data report 674. Note that this may occur at any point including immediately after IoT node 640 receives data annotation configuration request 661. For example, upon receipt of data annotation configuration request 661, IoT node 640 may request to receive if necessary, and begin to buffer the data stream from IoT node 630 in preparation for annotating IoT node 630's data stream and transmitting IoT node 630's annotated data stream.

At block 675, IoT node 640 annotates the data stream received from IoT node 630 based on the obtained and/or determined annotation concepts and/or data as determined at blocks 673. IoT node 640 may subsequently transmit the annotated data stream to one or more IoT entities (not shown). At block 676, IoT node 640 may store the annotated data stream and the determined annotation concept. IoT node 640 may also, or instead, forward the annotated data stream to other IoT nodes.

Figure 7:
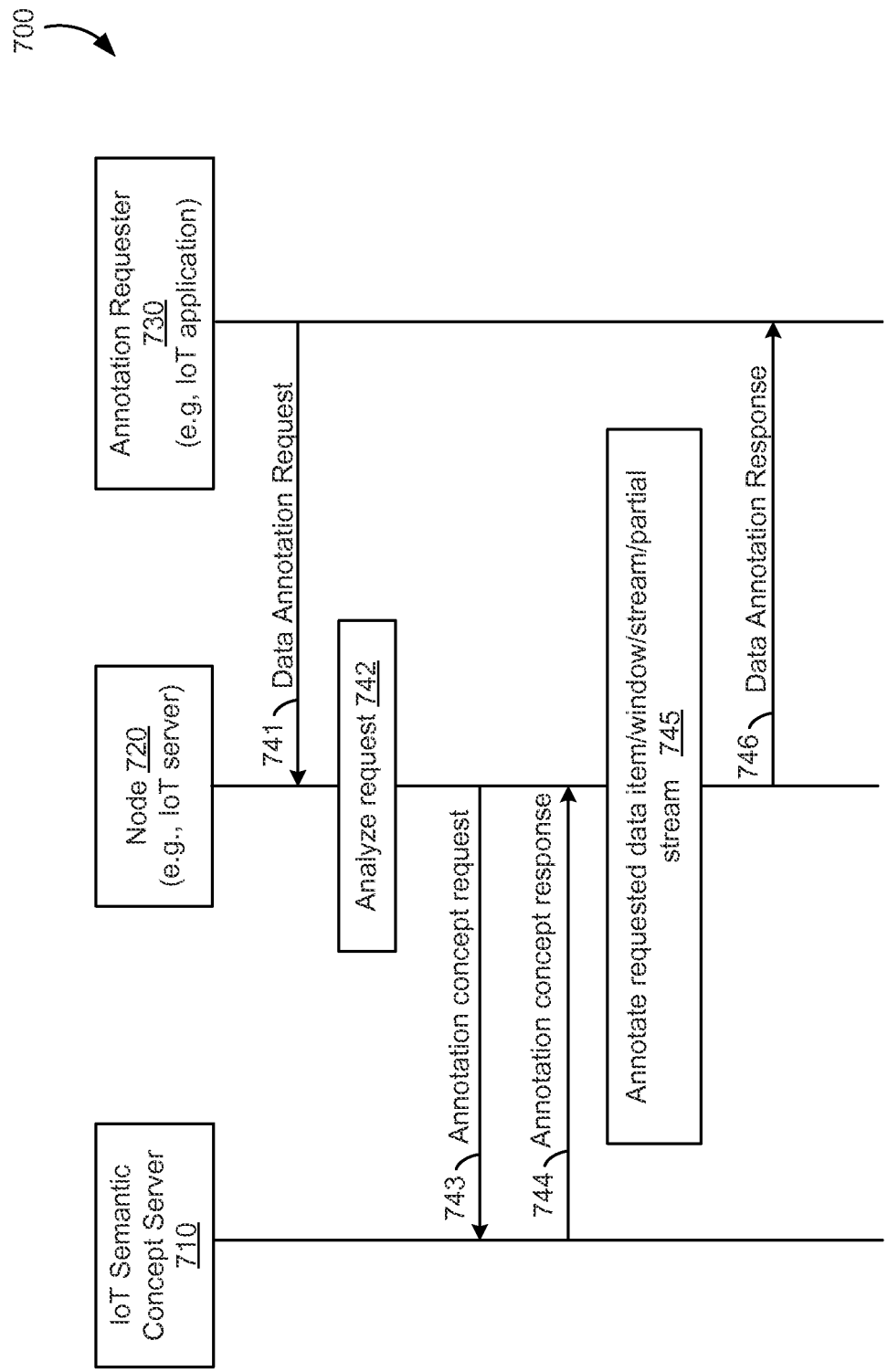
FIG. 7 illustrates another exemplary signal flow that may be used in the disclosed embodiments of data annotation as a service.

FIG. 7 shows exemplary, non-limiting signal flow 700 illustrating exemplary signals and procedures for requested data annotation (RDA). In some embodiments, an annotation requester, such as annotation requester 730, which may be an IoT application, requests to add annotations to data stored at another node, such as IoT node 720 that may be an IoT server.

Annotation requester 730 may send data annotation request 741 to IoT node 720. In some embodiments, data annotation request 741 may contain multiple annotation elements. Each annotation element may request annotations on different data (e.g., data items, data windows, data streams, partial data streams, etc.). Each annotation element may contain data such as a particular data stream(s) to be annotated, specific data item(s) to be annotated, and/or specific data windows to be annotated.

Data annotation request 741 may also, or instead, indicate a level of annotation to be used. For example, data annotation request 741 may include an instruction to use item-level annotation, window-level annotation, stream-level annotation, cross-partial-stream level annotation, and/or cross-stream allocation.

Data annotation request 741 may also, or instead, indicate an annotation concept or data to be used. For example, data annotation request 741 may explicitly indicate an annotation concept or data to be used in annotating the indicated data stream. Alternatively, or in addition, data annotation request 741 may include one or more links pointing to one or more annotation concepts or data that may be stored at an IoT concept server, such as IoT concept server 710. Alternatively, or in addition, data annotation request 741 may indicate existing data streams from which annotation concepts or data may be determined and/or obtained. Alternatively, or in addition, data annotation request 741 may include a request for IoT node 720 to select and/or determine appropriate concepts and/or data for annotation of the indicated data stream(s).

At block 742, IoT node 720 may analyze data annotation request 741. As noted above, data annotation request 741 may include a link to one or more existing concepts or data stored at IoT concept server 710. If so, IoT node 720 may send annotation concept request 743 to IoT concept server 710 requesting a reply that includes the specific concepts and/or data indicated in data annotation request 741. In this embodiment, IoT concept server 710 may send annotation concept response 744 to IoT node 720 in response to receiving annotation concept request 743.

At block 745, IoT node 720 may use the annotation concepts and/or data obtained from data annotation request 741 and/or IoT concept server 710 to annotate the data items, data windows, data streams, and/or partial streams indicated in data annotation request 741. Subsequently, IoT node 720 may send data annotation response 746 to annotation requestor 730 indicating whether the annotation was successful or not.

Figure 8:
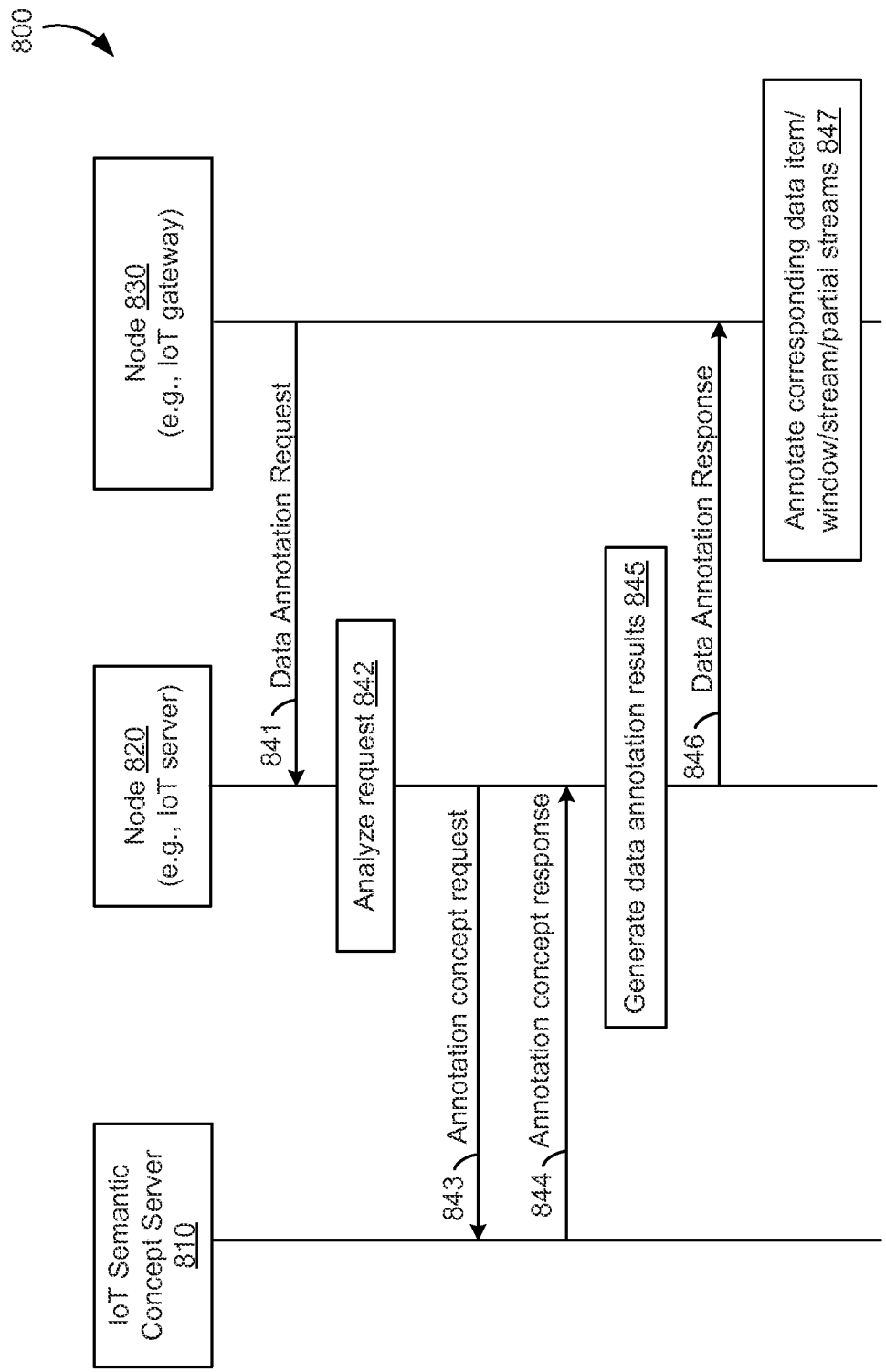
FIG. 8 illustrates another exemplary signal flow that may be used in the disclosed embodiments of data annotation as a service.

FIG. 8 shows exemplary, non-limiting signal flow 800 illustrating other exemplary signals and procedures for requested data annotation (RDA). In this embodiment, an IoT node, such as an IoT gateway, may request that another IoT node, such as an IoT server, add annotations to data stored on the requesting IoT node. For example, IoT node 830, which may be an IoT gateway, may send data annotation request 841 to IoT node 820, which may be an IoT server. Data annotation request 841 may include one or more annotation elements, each of which may request different annotations on different data. Each annotation element may include data indicating the data stream(s) on IoT node 830 to be annotated and abstract information about each of these data streams (e.g., description of the data stream), and the specific data items, windows, streams, and/or partial streams to be annotated.

At block 842, IoT node 820 may analyze data annotation request 841 to determine an appropriate annotation concept and/or data, an annotation level to be used by IoT node 830, and/or an annotation concept entity from which to obtain the annotation concept. IoT node 820, in an embodiment upon determining an annotation concept entity based on request 841 or upon using some other means to determine an annotation concept entity, may send annotation concept request 843 to IoT semantic concept server 810 requesting concepts and/or data related to data annotation request 841. IoT node 820 may receive annotation concepts and/or data from IoT semantic concept server 810 in annotation concept response 844.

At block 845, IoT node 820 may determine the data annotation results for the data streams indicated by data annotation request 841 based, at least in part in some embodiments, from data received from IoT semantic concept server 810 and/or data in data annotation request 841. In some embodiments, IoT node 820 determines the annotation concept and/or data that should be applied to which particular data item, window, stream, etc. for each annotation element provided in data annotation request 841.

Upon determination of the annotation concept, IoT node 820 may send data annotation response 846 to IoT node 830 that may contain multiple annotation result elements. Each annotation result element may contain the concept and/or data that should be added to the data item/window/stream associated with each annotation element specified in data annotation request 841. In some embodiments, the annotation result element(s) within data annotation response 846 may explicitly indicate the annotation concept and/or data to be used. In other embodiments the annotation result element(s) within data annotation response 846 may provide a link pointing to one or more concept or data stored at an IoT semantic concept server, such as IoT semantic concept server 810. In yet other embodiments, the annotation result element(s) within data annotation response 846 may indicate existing data streams from which annotation concepts may be determined and/or obtained. At block 847, IoT node 830 applies annotations to the appropriate data items, data windows, and/or data streams. Note that in some embodiments, IoT node 820 may proactively send annotation results to IoT node 830, in which case it may not be necessary to send data annotation request 841 and/or perform the processing of block 842.

Figure 9:
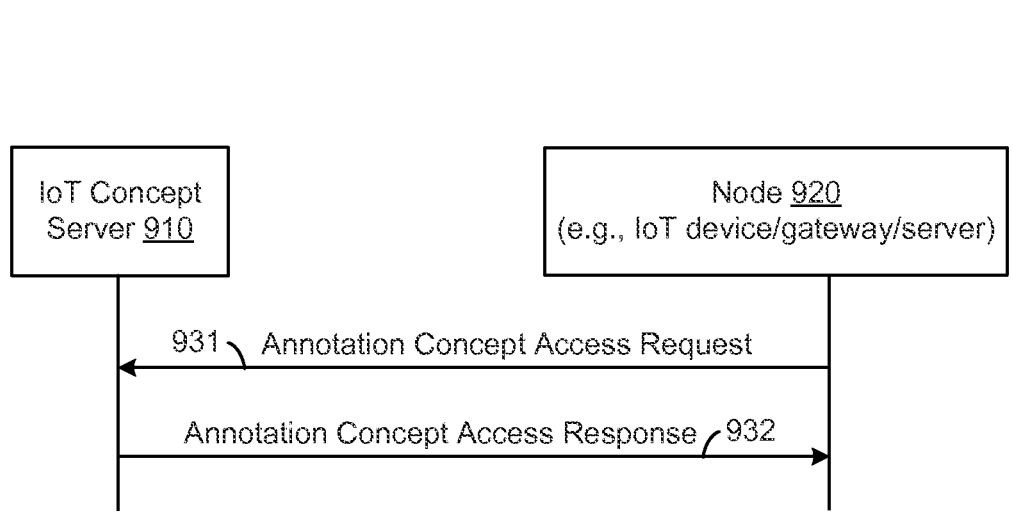
FIG. 9 illustrates another exemplary signal flow that may be used in the disclosed embodiments of data annotation as a service.

FIG. 9 shows exemplary, non-limiting signal flow 900 illustrating exemplary signals and procedures for annotation concept management. IoT node 920, which may be an IoT device, gateway, or server, may send annotation concept access request 931 to IoT semantic concept server 910. Annotation concept access request 931 may be used to perform various concept operations at IoT semantic concept server 910, such as the discovery of one or more annotation concepts or data, the addition of one or more annotation concepts or data, the deletion of one or more annotation concepts or data, the retrieval of one or more annotation concepts or data, and/or the updating of one or more annotation concepts or data. Other additional operations may include combining multiple concepts and/or data and determining correlations among multiple concepts and/or data. IoT semantic concept server 910 may send annotation concept access response 932 to IoT node 920 indicating the success or failure of annotation concept access request 931.

Figure 10:
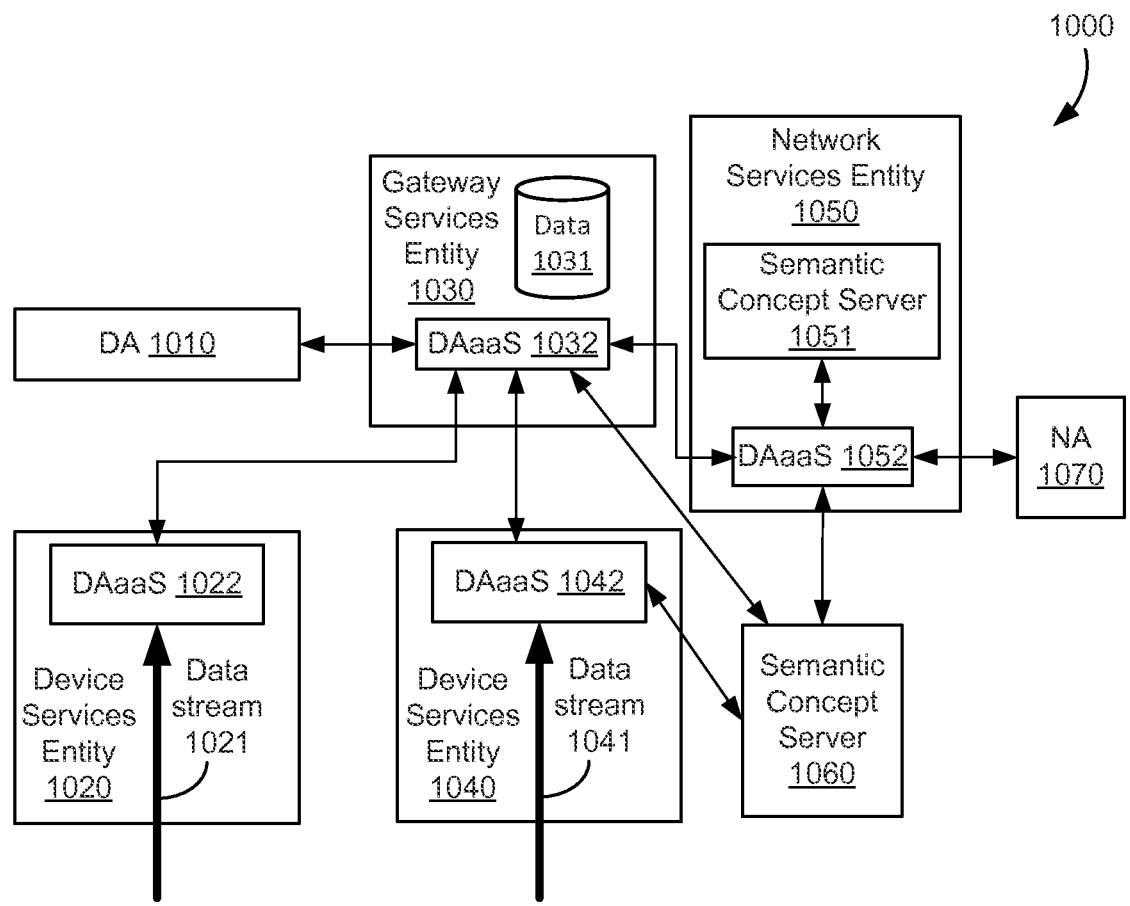
FIG. 10 illustrates another exemplary architecture in which data annotation as a service may be implemented according to an embodiment.

FIG. 10 shows DAaaS architecture 1000 that may enable data annotation in M2M service platforms. DAaaS may be integrated into a device services entity (e.g., device services capability layer (DSCL) in ETSI M2M implementations or application service node common service entity (ASN-CSE) in oneM2M implementations), a gateway services entity (e.g., gateway services capability layer (GSCL) in ETSI M2M implementations or middle node common service entity (MN-CSE) in oneM2M implementations), and/or a network services entity (e.g., network services capability layer (NSCL) in ETSI M2M implementations or infrastructure node common service entity (IN-CSE) in oneM2M implementations) as a service capability or a service layer platform. In FIG. 10, DAaaS 1022 of device services entity 1020, which may be processing data stream 1021, may communicate with DAaaS 1032 of gateway services entity 1030. DAaaS 1042 of device services entity 1040 may also communicate with DAaaS 1032 of gateway services entity 1030. Device application (DA) 1010 and/or network application (NA) 1070 may communicate via interfaces with DAaaS 1032 to initiate and/or manipulate the data annotation functionalities of DAaaS 1032. Note that device application (DA) 1010 could be an application dedicated node application entity (ADN-AE) in oneM2M implementations. Note also that network application (NA) 1070 could be an infrastructure node application entity (IN-AE) in oneM2M implementations. Note also that semantic concept server 1051 may be integrated into network services entity 1050. Alternatively, semantic concept server 1060 may be implemented as a standalone entity. A DAaaS in any services entity may be configured to communicate with semantic concept server 1051.

Figure 11:
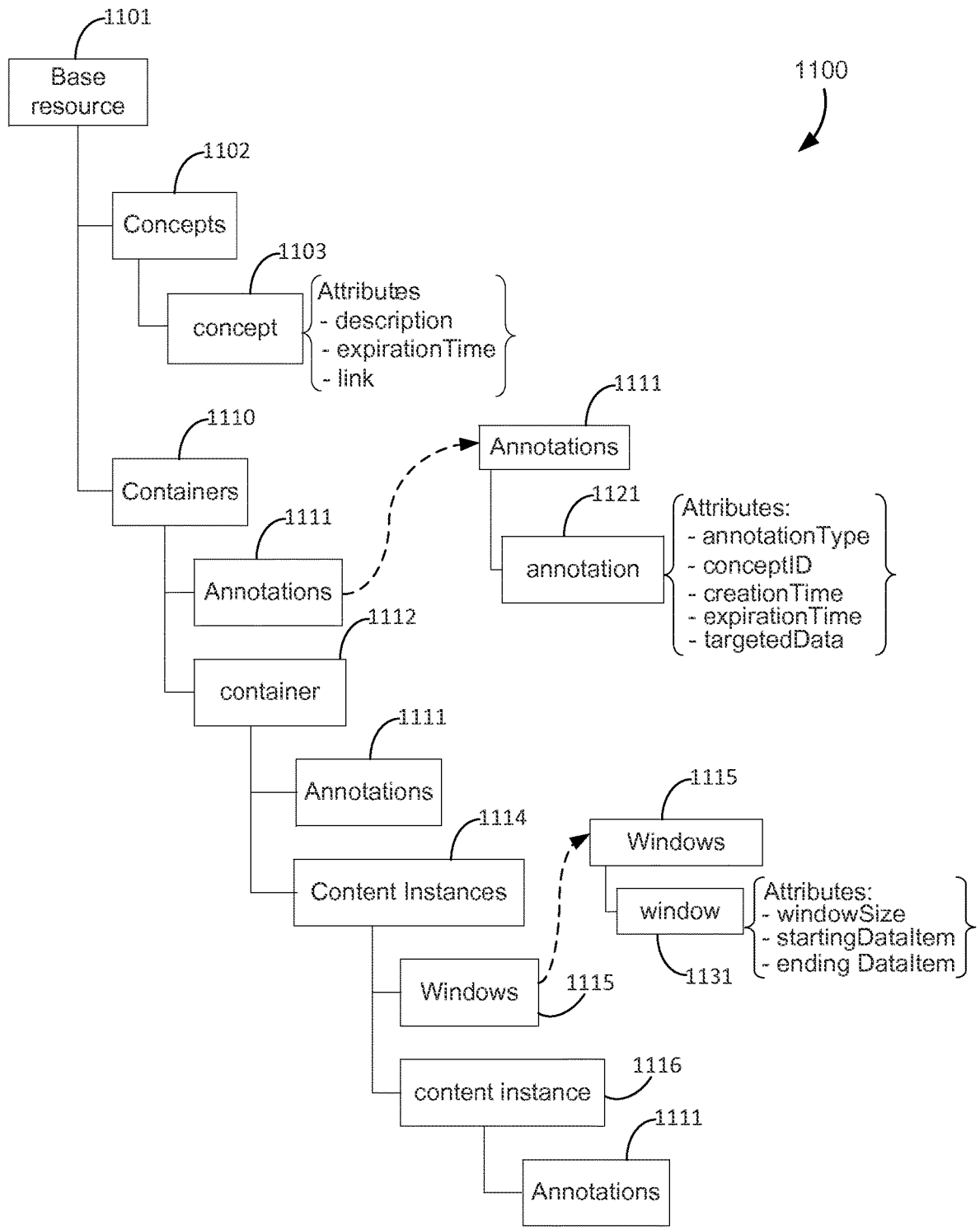
FIG. 11 illustrates an exemplary data structure that may be used in the disclosed embodiments of data annotation as a service.

FIG. 11 illustrates exemplary non-limiting resource structure 1100 that may be used to support DAaaS in some embodiments. For example, structure 1100 may be used to implement the disclosed DAaaS embodiments within an ETSI M2M service architecture. Structure 1100 may also be used in other architectures and implementations.

Base resource 1101, which, in an ETSI M2M implementation, may be an <sclBase> and/or <scl> resource that may be shared by other resources and in a oneM2M implementation may be an <CSEbase> and/or <remoteCSE> resource, may include collection resource concepts 1102 that may include one or more concept resources that may be used to maintain one or more annotation concepts or annotation data, one of which is shown in FIG. 11 as sub-resource concept 1103. Concept 1103 may be used to annotate or label a data item, data window, data stream, and/or multiple entire or partial data streams. Note that concept 1103 may be associated with an event. Concept 1103 may include attributes such as a description describing concept contained therein (e.g., "a person is preparing the lunch in the kitchen"), an expiration time indicating a time at which concept 1103 will be no longer valid, and a link indicating that concept 1103 is a virtual concept associated with a real concept that may be stored at the location indicated by the link. The value of the link attribute of concept 1103 may be represented as a URI.

Structure 1100 may also include containers resource 1110. Within containers 1100 may be collection resource annotations 1111 that may be used to maintain the annotations added to data items, data windows, data streams, and/or multiple entire or partial data streams. Note that in FIG. 11, several annotations 1111 resources are show to illustrate the various locations within structure 1100 that annotations 1111 may be configured. For example, annotations 1111 may alternatively be a sub-resource of other resources, such as a content instances collection resource 1116, and/or a content instance resource. Annotations 1111 may also be located directly under base resource 1101 and may be shared by other resources, such as containers 1110, container 1112, content instances 1114, and/or content instance 1116.

Each annotation may be represented by sub-resource annotation 1121 (shown to the right of annotations 1111 in FIG. 11). Each annotation resource indicates a notation label for the annotation and may include attributes such as annotation type that indicates the type of annotation (e.g., location, time, people activity, weather, appliance status, etc.), concept ID that identifies an existing concept resource, creation time that indicates when annotation 1121 was created, expiration time that indicates the time at which annotation 1121 will become invalid, and targeted data that indicated the resource on which annotation 1121 is added. A targeted data attribute of annotation 1121 may be optional when annotation 1121 is configured under annotations 1111 collection resource that is configured under containers collection resource 1110 or under content instance resource 1116. Where annotation 1121 is configured under annotations 1111 collection resource that is configured under a container resource such as container 1112, the targeted data attribute may be used to indicate a data window to which the annotation resources is added.

Another resource that may be configured in structure 1100 is collection resource windows 1115 that may define data windows of a data stream. In an embodiment, a data stream may be represented by a container resource and therefore windows 1115 may be a sub-resource of content instances 1114 collection resource. Windows 1115 may have one or more window 1131 sub-resources, each of which may represent a data window of a data stream. A data window may contain one or more than one data item. Window 1131 may have attributes such as a window size indicating the number of data items contained in the window represented by window 1131, a starting data item representing the first data item (that may be represented by a content instance resource) in the window represented by window 1131, and an ending data item that may represent the last data item (that may also be represented by a content instance resource) in the window represented by window 1131.

Figure 12A:
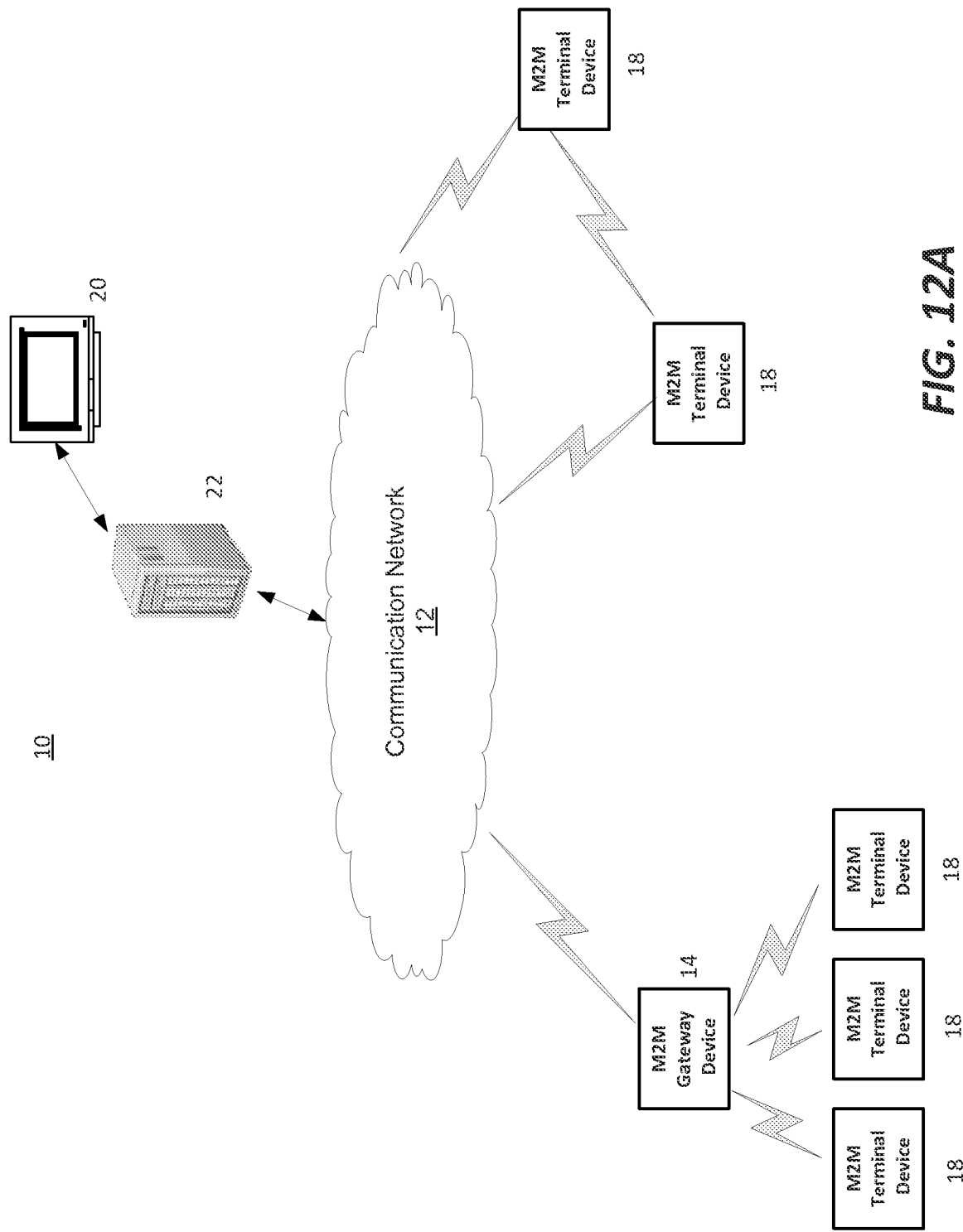
FIG. 12A is a system diagram of an example machine-to-machine (M2M) or Internet of Things (IoT) communication system in which one or more disclosed embodiments may be implemented.

FIG. 12A is a diagram of an example M2M or IoT communication system 10 in which one or more disclosed embodiments of systems and methods for data annotation as a service may be implemented. Generally, M2M technologies provide building blocks for the IoT, and any M2M device, gateway, or service platform may be a component of the IoT as well as an IoT service layer, etc.

As shown in FIG. 12A, the M2M/IoT communication system 10 includes a communication network 12. The communication network 12 may be a fixed network or a wireless network (e.g., WLAN, cellular, or the like) or a network of heterogeneous networks. For example, the communication network 12 may comprise of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 12A, the M2M/IoT communication system 10 may include an M2M gateway device 14, and M2M terminal devices 18. It will be appreciated that any number of M2M gateway devices 14 and M2M terminal devices 18 may be included in the M2M/IoT communication system 10 as desired. Each of the M2M gateway devices 14 and M2M terminal devices 18 may be configured to transmit and receive signals via the communication network 12 or direct radio link. The M2M gateway device 14 allows wireless M2M devices (e.g., cellular and non-cellular) as well as fixed network M2M devices (e.g., PLC) to communicate either through operator networks, such as the communication network 12, or through direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service platform 22, as described below. M2M devices 18 and gateways 14 may communicate via various networks including, cellular, WLAN, WPAN (e.g., Zigbee, 6LoW-PAN, Bluetooth), direct radio link, and wireline for example. Any of the entities described herein, such as entities implementing DAaaS, annotation requesters, data stream generating entities, concept servers, IoT nodes, sensors, and any other entities and devices set forth herein, may be implemented, executed, or otherwise enabled, partially or entirely, on devices such as M2M devices 18, gateways 14, and service platform 22. All such embodiments are contemplated as within the scope of the present disclosure.

The illustrated M2M service platform 22 provides services for the M2M application 20, M2M gateway devices 14, M2M terminal devices 18, and the communication network 12. It will be understood that the M2M service platform 22 may communicate with any number of M2M applications, M2M gateway devices 14, M2M terminal devices 18, and communication networks 12 as desired. The M2M service platform 22 may be implemented by one or more servers, computers, or the like. The M2M service platform 22 provides services such as management and monitoring of M2M terminal devices 18 and M2M gateway devices 14. The M2M service platform 22 may also collect data and convert the data such that it is compatible with different types of M2M applications 20. The functions of the M2M service platform 22 may be implemented in a variety of ways, for example as a web server, in the cellular core network, in the cloud, etc.

Figure 12B:
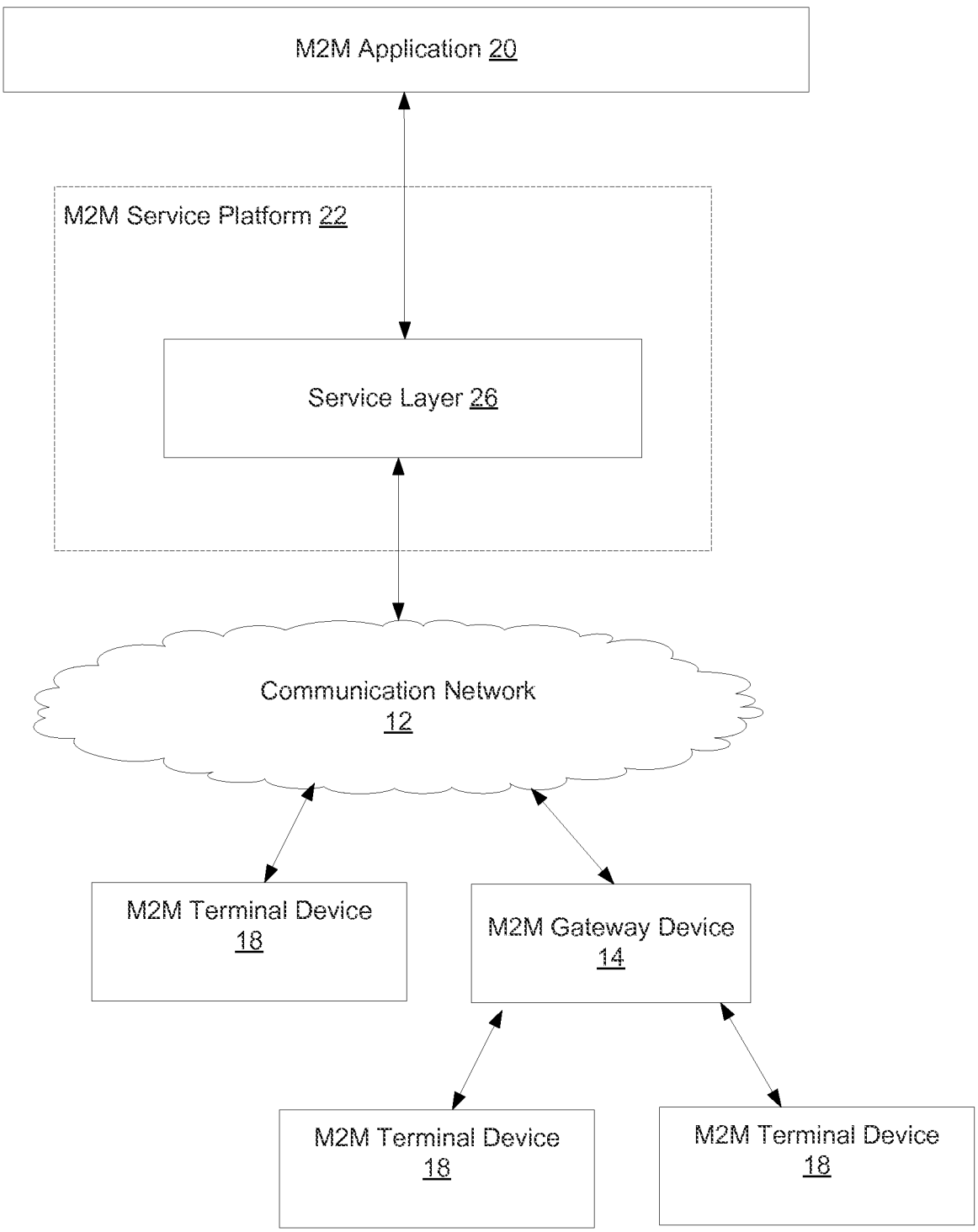
FIG. 12B is a system diagram of an example architecture that may be used within the M2M/IoT communications system illustrated in FIG. 12A.

Referring also to FIG. 12B, the M2M service platform typically implements a service layer 26 (e.g. a network service capability layer (NSCL) as described herein) that provides a core set of service delivery capabilities that diverse applications and verticals can leverage. These service capabilities enable M2M applications 20 to interact with devices and perform functions such as data collection, data analysis, device management, security, billing, service/device discovery, etc. Essentially, these service capabilities free the applications of the burden of implementing these functionalities, thus simplifying application development and reducing cost and time to market. The service layer 26 also enables M2M applications 20 to communicate through various networks 12 in connection with the services that the service layer 26 provides.

In some embodiments, M2M applications 20 may include desired applications that form the basis for creation of one or more peer-to-peer networks that include devices that may use the disclosed of systems and methods for data annotation as a service. M2M applications 20 may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20. The applications with which the described service layer and objects interact may be applications such as those of M2M applications 20.

Figure 12C:
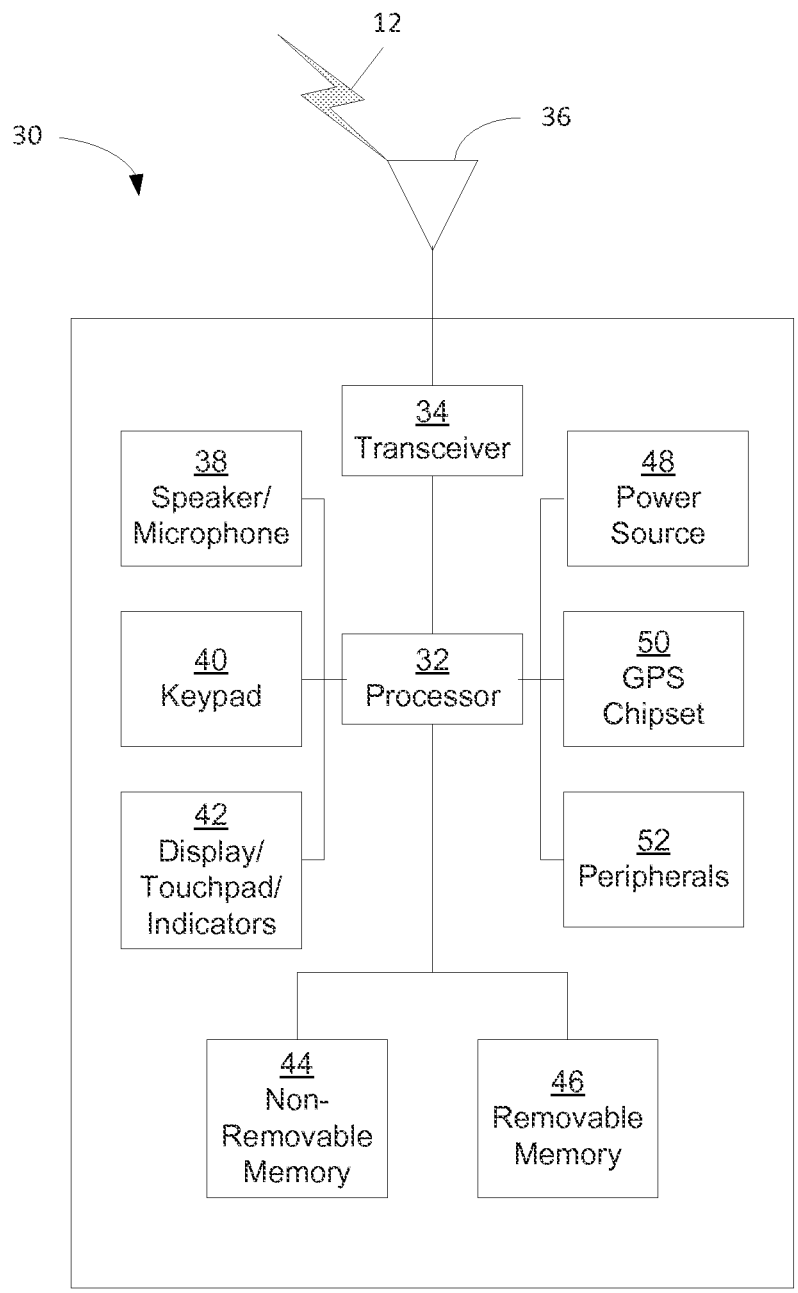
FIG. 12C is a system diagram of an example M2M/IoT terminal or gateway device that may be used within the communications system illustrated in FIG. 12A.

FIG. 12C is a system diagram of an example M2M device 30, such as an M2M terminal device 18 or an M2M gateway device 14 for example. As shown in FIG. 12C, the M2M device 30 may include a processor 32, a transceiver 34, a transmit/receive element 36, a speaker/microphone 38, a keypad 40, a display/touchpad/indicators (e.g., one or more light emitting diodes (LEDs)) 42, non-removable memory 44, removable memory 46, a power source 48, a global positioning system (GPS) chipset 50, and other peripherals 52. It will be appreciated that the M2M device 40 may include any sub-combination of the foregoing elements while remaining consistent with an embodiment. This device may be a device that uses the disclosed systems and methods for data annotation as a service.

The processor 32 may be a general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGAs) circuits, any other type and number of integrated circuits (ICs), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 12C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access layer and/or application layer for example.

The transmit/receive element 36 may be configured to transmit signals to, and/or receive signals from, an M2M service platform 9. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 12C as a single element, the M2M device 30 may include any number of transmit/receive elements 36. More specifically, the M2M device 30 may employ MIMO technology. Thus, in an embodiment, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer. The processor 32 may be configured to control lighting patterns, images, or colors on the display or indicators 42 in response to various conditions and parameters, such as those described in some of embodiments set forth herein.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which may be configured to provide location information (e.g., longitude and latitude) regarding the current location of the M2M device 30. It will be appreciated that the M2M device 30 may acquire location information by way of any suitable location-determination method while remaining consistent with an embodiment.

The processor 32 may further be coupled to other peripherals 52 that may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 12D:
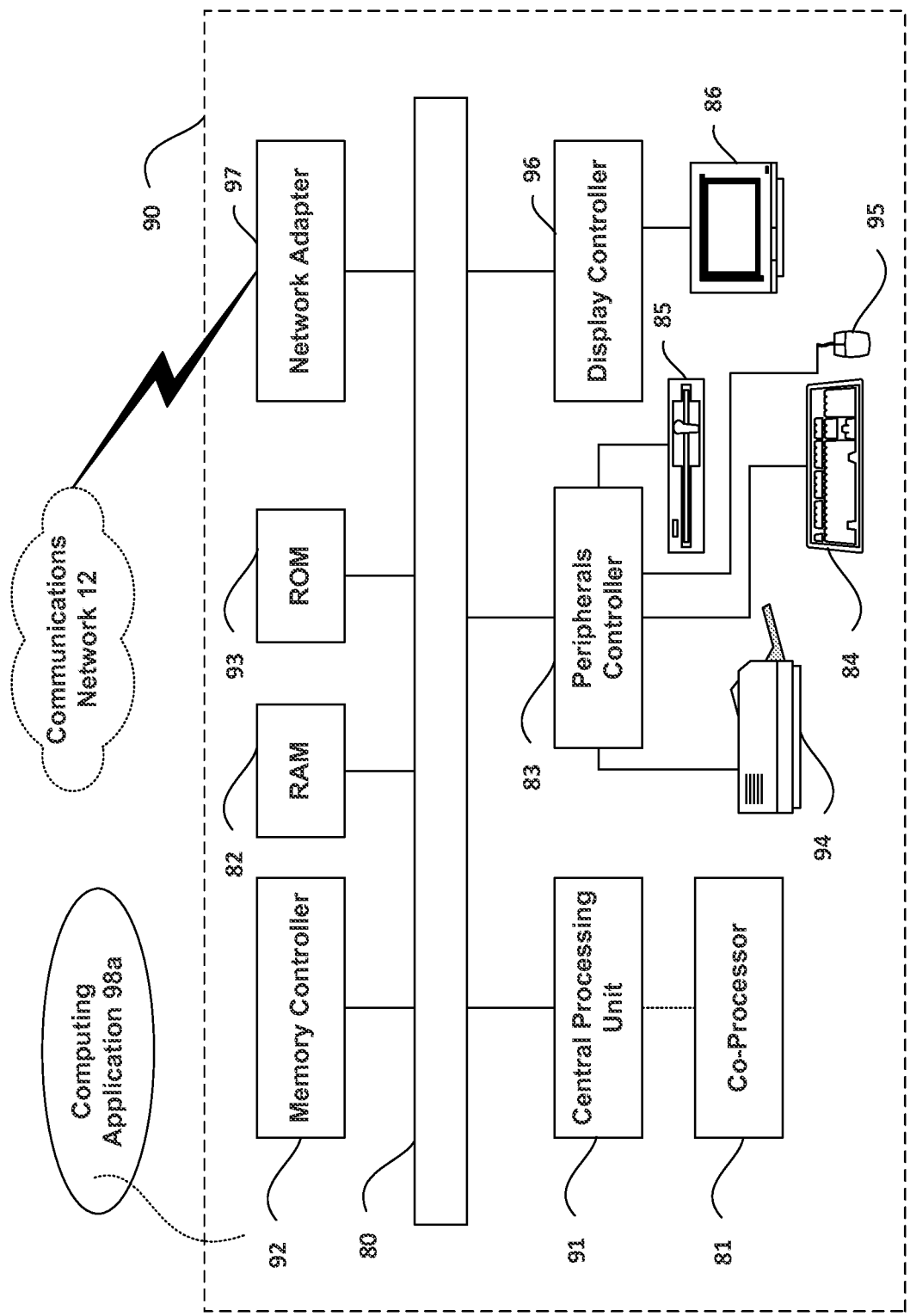
FIG. 12D is a block diagram of an example computing system in which aspects of the communication system of FIG. 12A may be embodied.

FIG. 12D is a block diagram of an exemplary computing system 90 on which, for example, the M2M service platform 22 of FIGS. 12A and 12B may be implemented. Computing system 90 may comprise a computer or server and may be controlled primarily by computer readable instructions that may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for data annotation as a service.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIGS. 12A and 12B. In an embodiment, network adaptor 97 may receive and transmit data related to the disclosed systems and methods for data annotation as a service.

It is understood that any or all of the systems, methods, and processes described herein may be embodied in the form of computer executable instructions (i.e., program code) stored on a computer-readable storage medium embodied as a physical device or apparatus. Such instructions, when executed by a machine, or a processor configured in a machine, such as a computer, server, M2M terminal device, M2M gateway device, or the like, effectuate, perform, and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium that can be used to store the desired information and that can be accessed by a computer.

In describing preferred embodiments of the subject matter of the present disclosure, as illustrated in the figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method comprising:
   receiving, at an Internet of Things, IoT, annotation entity in a network of connected IoT entities, a first data stream from a first IoT entity in the network of connected IoT entities;
   generating semantic information from the first data stream;
   storing the semantic information in an M2M service layer resource;
   receiving, at the IoT annotation entity, a second data stream from a second IoT entity in the network of connected IoT entities, the second data stream comprising multiple data items in multiple data windows;
   determining, at the IoT annotation entity and based on the semantic information, semantic metadata that is appropriate for annotating the second data stream; and
   annotating, at the IoT annotation entity and using the semantic metadata to one or more data items in one or more data windows, the second data stream.

2. The method of claim 1, further comprising:
   receiving a request to annotate the second data stream from a third IoT entity in the network of connected IoT entities,
   wherein determining the data annotation to be applied to the second data stream comprises determining the data annotation to be applied to the second data stream in response to the request to annotate the second data stream.

3. The method of claim 1, further comprising receiving a third data stream from a third IoT entity in the network of connected entities,
   wherein determining the data annotation to be applied to the second data stream comprises automatically determining the data annotation to be applied to the second data stream based on the third data stream.

4. The method of claim 1, further comprising receiving a third data stream from a third IoT entity in the network of connected entities,
   wherein annotating the second data stream based on the data annotation comprises annotating the second data stream based on the data annotation and the third data stream.

5. The method of claim 1, further comprising:
   receiving a third data from a third IoT entity in the network of connected entities; and
   receiving a request to annotate the second data stream from a fourth IoT entity in the network of connected IoT entities,
   wherein determining the data annotation to be applied to the second data stream comprises determining the data annotation to be applied to the second data stream in response to the request to annotate the data stream.

6. The method of claim 1, further comprising transmitting a data annotation response to a third IoT entity in the network of connected IoT entities.

7. An IoT annotation entity in a network of connected IoT entities comprising a processor adapted to execute computer-readable instructions and a memory communicatively coupled to the processor and having stored therein computer-readable instructions that, when executed by the processor, cause the processor to effectuate operations comprising:
   receiving, at an Internet of Things, IoT, annotation entity in a network of connected IoT entities, a first data stream from a first IoT entity in the network of connected IoT entities;
   generating semantic information from the first data stream;
   storing the semantic information in an M2M service layer resource;
   receiving, at the IoT annotation entity, a second data stream from a second IoT entity in the network of connected IoT entities, the second data stream comprising multiple data items in multiple data windows;
   determining, at the IoT annotation entity and based on the semantic information, semantic metadata that is appropriate for annotating the second data stream; and
   annotating, at the IoT annotation entity and using the semantic metadata to one or more data items in one or more data windows, the second data stream.

8. The annotation entity of claim 7, wherein the operation of annotating the second data stream comprises annotating at least one data item within the second data stream based on the data annotation.

9. The annotation entity of claim 7, wherein the operation of annotating the second data stream comprises annotating an entirety of the second data stream based on the data annotation.

10. The annotation entity of claim 7, wherein the operation of annotating the data second stream comprises annotating a portion of the first data stream and a portion of the second data stream based on the data annotation.

11. The annotation entity of claim 7, wherein the operation of determining the data annotation comprises obtaining the data annotation from an annotation concept entity.

12. The annotation entity of claim 11, wherein the operations further comprise receiving a request to annotate the second data stream from a third IoT entity in the network of IoT connected entities, wherein the request comprises the data annotation.

* * * * *